United States Patent [19]
Nelson

[11] 3,827,161
[45] Aug. 6, 1974

[54] EDUCATIONAL MATHEMATICAL DEVICE
[75] Inventor: Edwin G. Nelson, West Palm Beach, Fla.
[73] Assignees: John Madison Harris; Jack N. McCarthy, ; a part interest to each
[22] Filed: June 20, 1973
[21] Appl. No.: 371,891

[52] U.S. Cl. .................................. 35/31 A, 35/74
[51] Int. Cl. ...................... G09b 1/22, G09b 19/02
[58] Field of Search ........... 35/31 A, 31 C, 35 F, 74

[56] References Cited
UNITED STATES PATENTS
| | | | |
|---|---|---|---|
| 1,833,793 | 11/1931 | Pfleger | 35/74 |
| 1,948,712 | 2/1934 | Hornung | 35/31 C X |
| 1,992,366 | 2/1935 | Fisher | 35/74 |
| 2,834,123 | 5/1958 | Knight | 35/74 X |
| 2,853,799 | 9/1958 | Magnussen et al. | 35/31 C X |

*Primary Examiner*—Wm. H. Grieb
*Attorney, Agent, or Firm*—Jack N. McCarthy

[57] ABSTRACT

A mathematical device for teaching a person the fundamentals of arithmetic is shown having a body shaped as a vehicle with two wheel assemblies representing the front and back wheels of the vehicle with an equals sign therebetween. The rear or left wheel assembly provides the "problem" side and the front or right wheel assembly provides the "answer" side. A modification is shown wherein the numbers and signs on the wheel assemblies can be lighted to provide a clearer contrast in viewing the device and also to provide a means for the instructor to notify the student whether or not he has arrived at the right answer for the problem set forth.

8 Claims, 7 Drawing Figures

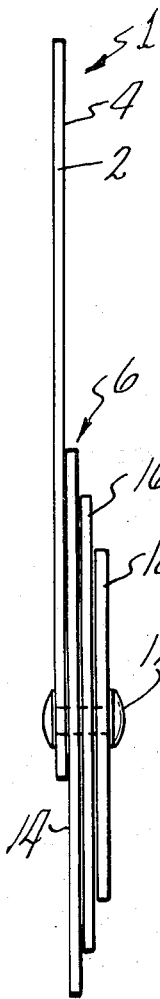
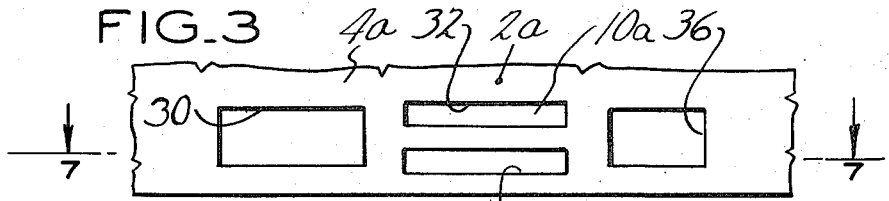
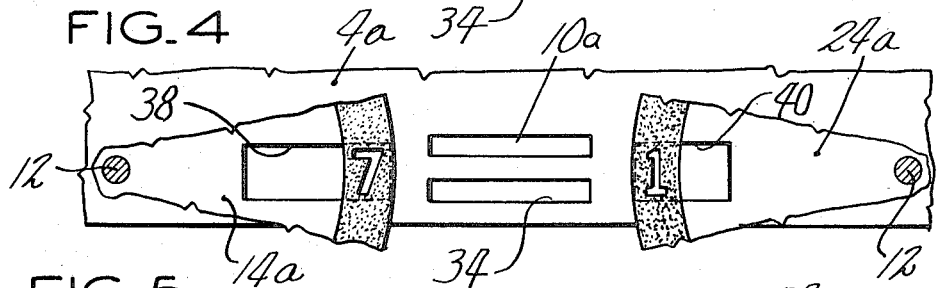
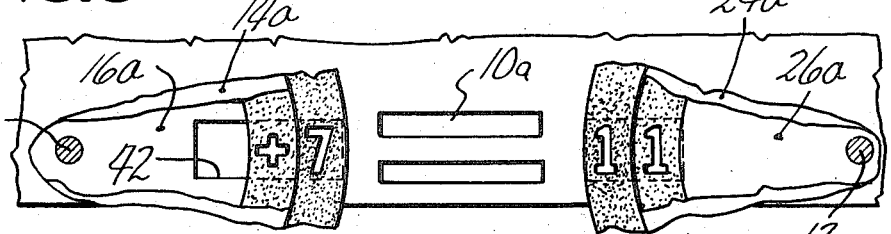
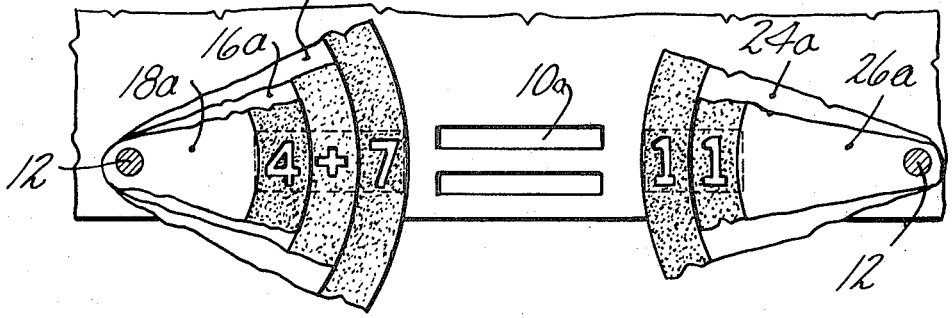
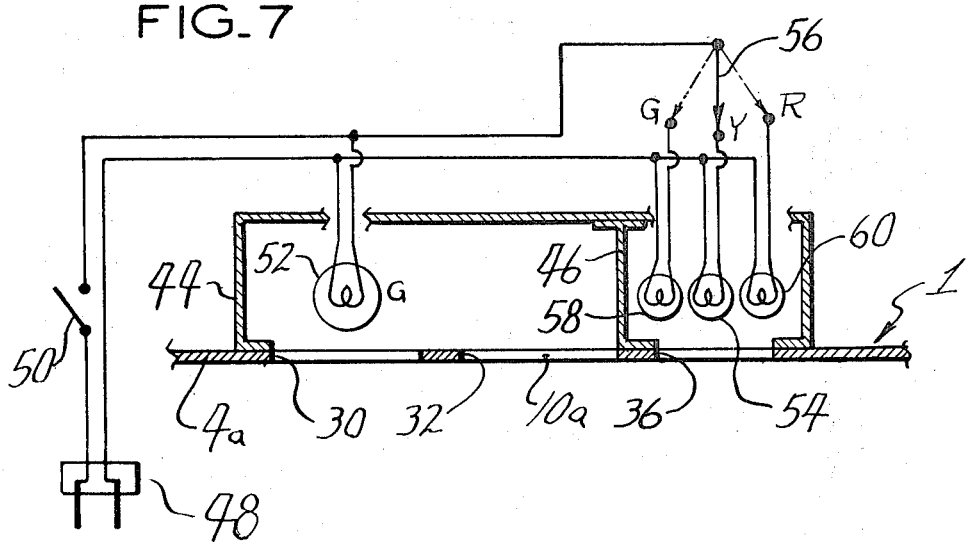

3,827,161

EDUCATIONAL MATHEMATICAL DEVICE

BACKGROUND OF THE INVENTION

This invention relates to the field of visual education and contains improvements advancing the art.

SUMMARY OF THE INVENTION

An object of this invention is to provide an educational mathematical device for getting one who needs to learn math interested in operating the device to learn basic arithmetic. A device is formed having a first wheel assembly for easily forming a "problem" involving addition, subtraction, division or multiplication and a second wheel assembly for providing the "answer".

A further object of this invention is to provide means for easily reading the numbers set forth on either of the two wheel assemblies. This can be done by permitting light from the underside of the wheel assemblies to show through the numbers and signs which can be cut out.

Another object of this invention is to provide means for showing the student whether or not he has arrived at the right answer. The teacher is provided with a manually operated control for lighting the answer numbers red, if the answer is wrong, and for lighting the answer numbers green, if the answer is right. The numbers of the problem and the openings for the equals sign will be green all the time.

BRIEF DESCRIPTION OF THE DRAWINGS

FIG. 2 is a view taken from the left of FIG. 1.

FIG. 3 is a fragmentary view of a portion of a modification of the device with the wheels removed.

FIG. 4 is a view similar to FIG. 3 showing a fragmentary portion of the bottom wheels of both the problem side and answer side positioned thereon.

FIG. 5 is a view similar to FIG. 4 adding a fragmentary portion of the next adjacent wheels.

FIG. 6 is a view similar to FIG. 5 adding a fragmentary portion of the top wheel on the problem side.

FIG. 7 is an enlarged view taken along the line 7—7 of FIG. 3 showing a modification of a lighting arrangement.

DESCRIPTION OF THE PREFERRED EMBODIMENTS

Figure 1:
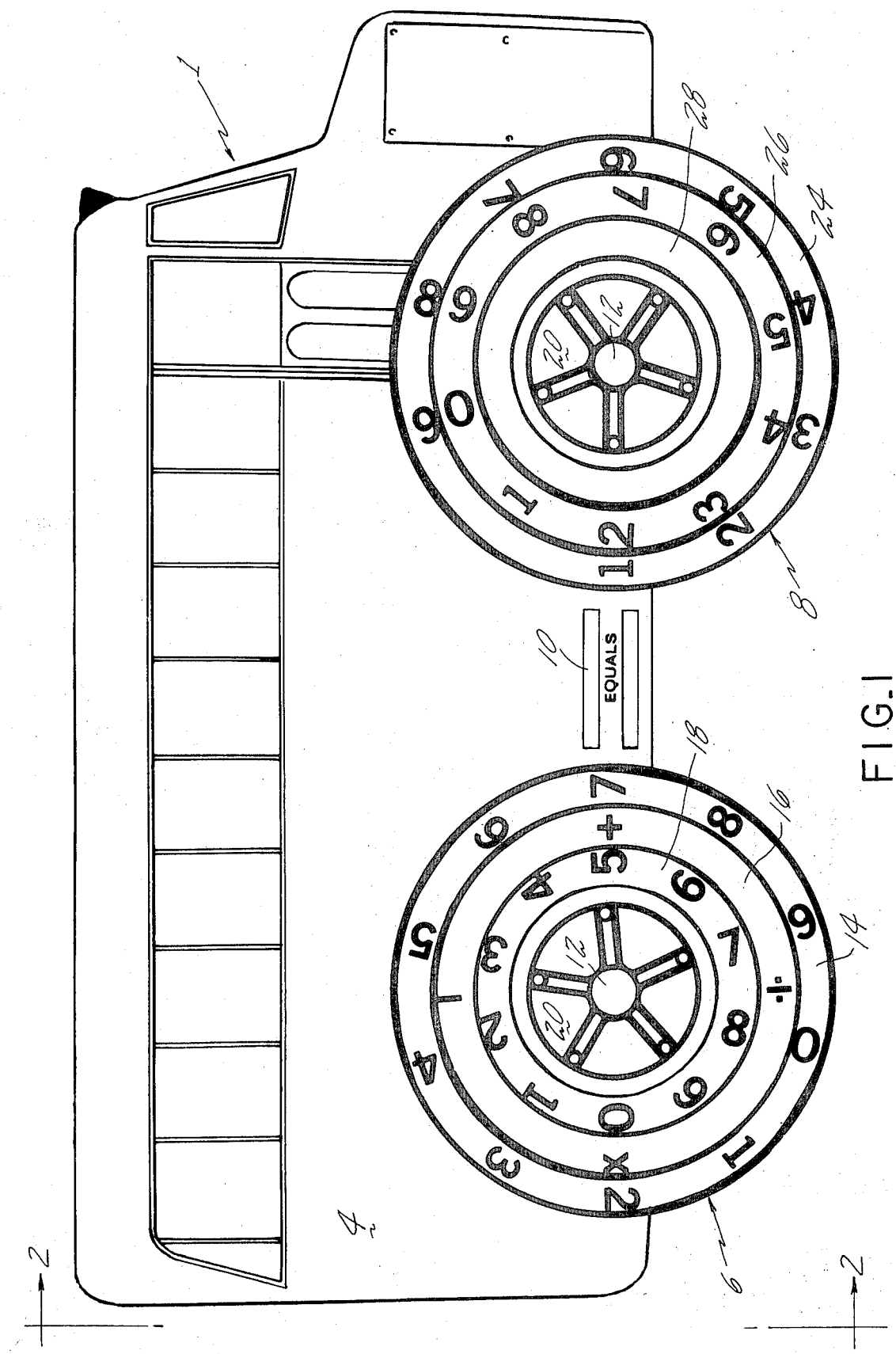
FIG. 1 is a front view of the device showing the operational wheels.

As shown in FIG. 1, the mathematical educational device 1 consists of a body 2 having a flat surface 4 thereon which forms the front of the device. In the modification shown, the body 2 is shaped as a bus and is formed as a flat member. It is to be realized that other shapes can be used and types of bodies other than a flat member can be used. Two sets of wheel assemblies 6 and 8 are mounted on the flat surface 4 of body 2 and spaced apart to provide for an equals sign 10.

In FIG. 1, the wheel assemblies appear as the front and rear wheels of the bus. A well known configuration such as a bus is shown because of its association with children. As mentioned before, other well known shapes can be used, such as a fire engine or milk truck. The wheel assembly on the left side sets forth the problem and the wheel assembly on the right side provides the answer.

The left wheel assembly 6 includes three movable wheels of different diameters all rotatably mounted on the same axis on the body 2 against the surface 4 by a rivet or other type of pinning means 12. A cotter pin could be used if desired.

The first wheel 14 has the largest diameter and is located at the bottom of the left wheel assembly against the flat surface 4 of the body 2 and projects below the bottom of the body. A second wheel 16 is the intermediate wheel and is located against the surface of the first wheel and has an intermediate diameter. The outer edge of the second wheel 16 of intermediate diameter leaves a first annular portion showing around the outer edge of the wheel 14.

A third wheel 18 is the top wheel and is located against the surface of the second wheel and has the smallest diameter. The outer edge of the third wheel 18 of the smallest diameter leaves a second annular portion showing around the outer edge of the wheel 16. A third annular portion is formed on the face of the wheel 18 around the outer edge of the wheel and is set off by the use of a hub design 20.

The numbers 1 through 9 and zero are formed on the first annular portion around its circumference so that the numbers and zero can be read on the right hand side of the first wheel 14. As shown in FIG. 1, this would be just to the left of the equals sign 10. The mathematical signs of addition, subtraction, division and multiplication are formed on the second annular portion around its circumference so that the signs can be read on the right hand side of the second wheel 16. In FIG. 1, these four signs are shown spaced 90° apart and are shown just to the left of the number on the first annular portion. The numbers 1 through 9 and zero are formed on the third annular portion around its circumference so that the numbers and zero can be read on the right hand side of the third wheel 18. In FIG. 1, this would be just to the left of the mathematical sign on the second annular portion. It can be seen that the three wheels can be rotated to provide any problem of addition, subtraction, division or multiplication involving the numbers 1 through 9 and zero. It must be realized that more than three wheels can be used to provide a larger problem and more than one number could be placed on each wheel.

The right hand wheel assembly 8 includes three movable wheels of different diameters all rotatably mounted on the same axis on the body 2 against the surface 4 by a rivet or other type of pinning means 12 as in the left wheel assembly. The first wheel 24 has the largest diameter and is located at the bottom of the right wheel assembly against the flat surface 4 of the body 2 and projects below the bottom of the body in the same manner as the first wheel 14 of the left wheel assembly. Wheel 24 has the same diameter as wheel 14. A second wheel 26 is the intermediate wheel and is located against the surface of the first wheel and has an intermediate diameter. Wheel 26 has the same diameter as wheel 16.

A third wheel 28 is the top wheel and is located against the surface of the second wheel and has the smallest diameter. Wheel 28 has the same diameter as wheel 18. The outer edge of the third wheel 28 of the smallest diameter leaves a second annular portion showing around the outer edge of the wheel 26. A third annular portion is formed on the face of the wheel 28 around the outer edge of the wheel 28 and is set off by the use of a hub design 20. In FIG. 1, this wheel is a dummy wheel and balances the appearance of the left wheel assembly.

The numbers 1 through 9 and a blank space are formed on the first annular portion around its circumference so that the numbers can be read on the left hand side of the first wheel 24. The blank space is used when the answer is a single number. As shown in FIG. 1, this would be just to the right of the equals sign 10. The numbers 1 through 9 and zero are formed on the second annular portion around its circumference so that the numbers and zero can be read on the left hand side of the second wheel 26. In FIG. 1, this would be just to the right of the number on the first annular portion. As mentioned before, the third wheel in this construction is a dummy wheel. It can be seen that the two wheels can be rotated to provide the answer to any problem of addition, subtraction, division or multiplication involving the numbers 1 through 9 and zero, since the largest number possible on the right wheel assembly is 99 and the problem requiring the largest answer by the left wheel assembly is 9 × 9 which is 81.

The annular portions could be made black and the numbers and signs white, this would be done to give the wheels an appearance of having tires and providing a number and background contrast. It is to be realized that the surface 4 could be a dark color and the wheels could be a light color with the numbers dark. It is believed here that the desirability is to have a contrast so that the numbers can be easily positioned and read, since the purpose is to permit learning of the fundamentals of arithmetic. Concerning the numbers of the answer, it must be realized that numbers can be placed on the third wheel 28 to increase the total to which the answer can be raised and that further, more wheels could be used for the same purpose.

FIGS. 3 to 6 disclose a modification of the device in which provisions are made so that light, daylight or artificial, can illuminate the problem, equals sign, and answer. This is done by providing an opening 30 in the body 2a which has a flat surface 4a, the opening being positioned under the problem. The equals sign 10a is formed by cut out slots 32 and 34. An opening 36 is provided in the body 2a for positioning behind the numbers of the answer. This construction is shown clearly in FIG. 3.

In this modification (see FIG. 4), the numbers of the wheels would be cut out such as shown by the numeral 7 on the problem side on the wheel 14a, and the numeral 1 on the answer side on wheel 24a. It can be seen that the numerals 7 and 1 will coincide with the openings 30 and 36, respectively, when they are included in the problem and the answer. An opening 38 is provided in wheel 14a to match the remaining portion of the opening 30 to permit light to reach a sign or numeral in the next wheels 16a and 18a. An opening 40 is provided in wheel 24a to match the remaining portion of the opening 36 to permit light to reach a numeral in the next wheel 26a.

Further (see FIG. 5), the wheel 16a has its signs formed as cut outs, such as the numerals in the wheel 14a, said sign when selected for the problem being aligned with the openings 38 and 30. An opening 42 is formed in the wheel 16a to match the remaining portion of the openings 38 and 30 to provide light for the numeral on the wheel 18a. Wheel 26a has its numerals also cut out and the numeral selected for an answer will be in alignment with openings 40 and 36 which permit light to reach the cut out numeral.

In this modification a box 44 could enclose the openings 30, 32, 34 and 36 from the back of surface 4 and a light bulb means placed therein for providing light behind all of the openings. A self-contained battery can be used or an extension cord with a plug. To provide an even lighting of each of the numerals and signs, a transparent parchment paper, frosted glass, or other means could be placed over the openings. The box 44 could be compartmented with different colors used for the problem and answer.

A modification of the lighting arrangement is shown in FIG. 7 where a "correcting means" is incorporated. The box 44 is divided into two compartments by a divider 46, one compartment enclosing the openings 30, 32, and 34, while the other compartment encloses the opening 36. A green light bulb device 52 is positioned in the compartment behind the openings 30, 32 and 34, while yellow, green and red light bulb devices, 54, 58 and 60, are placed in the compartment behind opening 36. The bulb devices are wired as shown in the schematic so that when the plug 48 engages an electrical source and switch 50 is closed, the green light bulb device 52 will be lit, along with the yellow light bulb device 54. Plug 48 could be a battery in a portable device. The switch 56 is the type which is spring biased to a center position and can be moved to one side or the other with the switch returning to the middle position when pressure has been removed. When an instructor or teacher moves the switch 56 to its left G position, as shown in FIG. 7, the green light bulb device 58 will be lit, and when the switch 56 is moved to its right R position, as shown in FIG. 7, the red light bulb device 60 will be lit.

In this modification, an instructor can have a switch 56 in his hand with an extension cord permitting him to be positioned in front of the educational device so that after a student has moved the answer wheels to a given position indicating an answer, the instructor can move the switch to a position, lighting the red light bulb device if the answer is wrong, or he can move the switch to another position, lighting the green light bulb device if the answer is right.

I claim:

1. An educational mathematical device having a body with a flat surface having two wheel means pivotally mounted thereon, a first wheel means and a second wheel means; said first wheel means including three moveable wheels of different diameters, a first wheel, a second wheel and a third wheel; said three moveable wheels all being pivoted about the same center, one on top of the other; the first of said moveable wheels having the largest diameter being located at the bottom of the wheels nearest the flat surface of the body; the second of said moveable wheels having the intermediate diameter being located at the middle of the wheels against the first wheel; said second wheel having an outer edge which is located inwardly from the outer edge of the first wheel; said first wheel having a first annular portion showing; the third of said moveable wheels having the smallest diameter being located on top of the wheels and against the second wheel; said third wheel having an outer edge which is located inwardly from the outer edge of the second wheel; said second wheel having a second annular portion showing; said third wheel having a third portion formed on its outer surface adjacent the second annular portion; numbers being formed on the first annular portion around its circumference so that the numbers can be read on the right hand side; a mathematical sign of addition, subtraction, division and multiplication being formed on the second annular portion around its circumference so that the signs can be read on the right hand side; numbers being formed on the third portion around its circumference so that the numbers can be read on the right hand side; said second wheel means including two moveable wheels of different diameter, a fourth wheel and a fifth wheel; said two moveable wheels being pivoted about the same center one on top of the other; the fourth of said moveable wheels having the larger diameter being located at the bottom of the wheels nearest the flat surface of the body; the fifth of said moveable wheels having the smaller diameter being located on top of and against the fourth wheel; said fifth wheel having an outer edge which is located inwardly from the outer edge of the fourth wheel; said fourth wheel having a fourth annular portion showing; said fifth wheel having a fifth portion formed on its outer surface adjacent the fourth annular portion; numbers being formed on the fourth annular portion around its circumference so that the numbers can be read on the left hand side; numbers being formed on the fifth portion around its circumference so that the numbers can be read on the left hand side; first means pivotally mounting said first wheel means to said body; second means pivotally mounting said second wheel means spaced from said first wheel means; an equals sign being formed on said flat surface of said body between the first and second wheel means so that a mathematical problem formed on the first wheel means, with the answer shown on the second wheel means, can be completed.

2. An educational mathematical device as set forth in claim 1 wherein said body has a bottom edge, said first and second wheel means extending below said bottom edge.

3. An educational mathematical device as set forth in claim 1 wherein said body is shaped as a vehicle and the first wheel means and second wheel means also serve as the wheels of the vehicle.

4. An educational mathematical device as set forth in claim 1 wherein said body is cut out underneath the mathematical problem on the first wheel means and said first, second and third wheels are cut so that light can pass from behind the body through the numerals and mathematical sign of the problem; said equals sign is cut out so that light can pass from behind the body through the equals sign; said body is cut out underneath the answer on the second wheel means and said fourth and fifth wheels are cut so that light can pass from behind the body through the numerals of the answer.

5. An educational mathematical device as set forth in claim 4 wherein a compartment means is attached to the body and forms an enclosed area including cutout portions of the body; light bulb means being provided in said compartment means for providing an artificial light.

6. An educational mathematical device as set forth in claim 5 wherein the compartment means includes a first compartment and a second compartment; said first compartment enclosing the cutout underneath the mathematical problem and the cutout equals sign; said second compartment means enclosing the cutout underneath the answer; said light bulb means including a first light bulb means and a second light bulb means; said first light bulb means being located in said first compartment; said second light bulb means being located in said second compartment; circuit means for lighting said first bulb means and illuminating the problem and equals sign; and circuit means for illuminating the answer one color when it is right and another color when it is wrong.

7. An educational mathematical device as set forth in claim 6 wherein said circuit means includes a switch for manual actuation of said circuit means.

8. An educational mathematical device as set forth in claim 6 wherein said second bulb means includes three light bulbs; one colored light bulb illuminating the answer selected; one colored light bulb of a different color for illuminating the answer when it is right; one colored light bulb of still a different color for illuminating the answer when it is wrong.

* * * * *